(12) United States Patent
Kumar et al.

(10) Patent No.: US 9,409,337 B2
(45) Date of Patent: Aug. 9, 2016

(54) POLYACRYLONITRILE/CELLULOSE NANO-STRUCTURE FIBERS

(71) Applicants: Satish Kumar, Atlanta, GA (US); Huibin Chang, Atlanta, GA (US)

(72) Inventors: Satish Kumar, Atlanta, GA (US); Huibin Chang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 203 days.

(21) Appl. No.: 14/509,362

(22) Filed: Oct. 8, 2014

(65) Prior Publication Data
US 2016/0016345 A1    Jan. 21, 2016

Related U.S. Application Data

(60) Provisional application No. 61/901,519, filed on Nov. 8, 2013, provisional application No. 61/903,048, filed on Nov. 12, 2013, provisional application No. 62/002,761, filed on May 23, 2014, provisional application No. 62/004,053, filed on May 28, 2014.

(51) Int. Cl.
B29C 47/00 (2006.01)
D01F 9/16 (2006.01)
D01F 6/54 (2006.01)
(Continued)

(52) U.S. Cl.
CPC .............. *B29C 47/0014* (2013.01); *D01F 6/54* (2013.01); *D01F 9/225* (2013.01); *B29K 2001/00* (2013.01); *B29K 2033/20* (2013.01); *D01F 1/10* (2013.01); *D01F 6/18* (2013.01)

(58) Field of Classification Search
CPC ............. D01F 6/54; D01F 9/225; D01F 1/10; D01F 6/18; B29C 47/0014; B29K 2033/20; B29K 2001/00

USPC .......................................... 423/447.1–447.9
See application file for complete search history.

(56) References Cited

U.S. PATENT DOCUMENTS 5,098,688 A    3/1992   Schimpf et al.
6,638,883 B2  10/2003   Gaffney et al.
(Continued)

FOREIGN PATENT DOCUMENTS

CN    202117274 U    1/2012
CN    102660768 A    9/2012
(Continued)

OTHER PUBLICATIONS

Chae, et al., Carbon nanotube reinforced diameter polyacrylonitrile based carbon fiber, Composites Science and Technology 2009; 69: 406-413.*

(Continued)

*Primary Examiner* — Daniel C McCracken
(74) *Attorney, Agent, or Firm* — Bryan W. Bockhop; Bockhop Intellectual Property Law, LLC

(57) ABSTRACT

In a method of making a carbon fiber, polyacrylonitrile is dissolved into a first solvent, thereby generating a first solution. A plurality of cellulose nano-structures is dispersed in a second solvent, thereby generating a first suspension. The first suspension is mixed with the first solution, thereby generating a first mixture. The first mixture is spun so as to draw fibers from the first mixture. The fibers are stabilized and then the fibers are carbonized. A fiber includes an elongated carbonized polyacrylonitrile matrix. A plurality of carbonized cellulose nano-structures is in the carbonized polyacrylonitrile matrix.

16 Claims, 1 Drawing Sheet

(51) Int. Cl.
*D01F 9/22* (2006.01)
*B29K 1/00* (2006.01)
*B29K 33/20* (2006.01)
*D01F 1/10* (2006.01)
*D01F 6/18* (2006.01)

(56) References Cited

U.S. PATENT DOCUMENTS

| | | | |
|---|---|---|---|
| 7,354,877 | B2 | 4/2008 | Rosenberger et al. |
| 7,708,805 | B2 | 5/2010 | Heine et al. |
| 7,786,253 | B2 | 8/2010 | Paulauskas et al. |
| 7,972,536 | B2 | 7/2011 | Connell et al. |
| 8,080,487 | B2 | 12/2011 | Gardner et al. |
| 8,608,992 | B2 | 12/2013 | Chasiotis et al. |
| 2007/0031662 | A1 | 2/2007 | Devaux et al. |
| 2010/0021682 | A1 | 1/2010 | Liang et al. |
| 2010/0272978 | A1 | 10/2010 | Kumar et al. |
| 2012/0003471 | A1* | 1/2012 | Bissett ............ D01D 1/02 428/367 |
| 2012/0126442 | A1 | 5/2012 | Ise et al. |
| 2012/0202397 | A1 | 8/2012 | Wolf et al. |
| 2013/0126794 | A1 | 5/2013 | Lee et al. |
| 2013/0302605 | A1 | 11/2013 | Yang et al. |
| 2014/0106167 | A1 | 4/2014 | Morris et al. |
| 2015/0037241 | A1* | 2/2015 | Lehmann ............ D01D 5/06 423/447.9 |

FOREIGN PATENT DOCUMENTS

| | | |
|---|---|---|
| CN | 102926020 A | 2/2013 |
| EP | 2 664 698 A1 | 11/2013 |
| JP | 2010261108 A | 11/2010 |
| WO | 01/92002 A2 | 12/2001 |
| WO | 2008/112349 A2 | 9/2008 |

OTHER PUBLICATIONS

Yang, et al., Preparation of PAN Spinning Solution with Fine Dispersion of Cellulose Microparticles, Advances in Materials Science and Engineering 2015; Article ID 534241: 1-5.*

Yang, et al., Manufacturing and characteristics of PAN-based composite carbon fibers containing cellulose particles, Carbon Letters 2015; 16(3): 203-210.*

Definition of carbonize, accessed online at http://www.merriam-webster.com/dictionary/carbonize on Jun. 18, 2016, pp. 1-8.*

* cited by examiner

POLYACRYLONITRILE/CELLULOSE NANO-STRUCTURE FIBERS

CROSS-REFERENCE TO RELATED APPLICATION(S)

This application claims the benefit of U.S. Provisional Patent Application Ser. No. 61/901,519, filed Nov. 8, 2013, the entirety of which is hereby incorporated herein by reference. This application claims the benefit of U.S. Provisional Patent Application Ser. No. 61/903,048, filed Nov. 12, 2013, the entirety of which is hereby incorporated herein by reference. This application claims the benefit of U.S. Provisional Patent Application Ser. No. 62/002,761, filed May 23, 2014, the entirety of which is hereby incorporated herein by reference. This application claims the benefit of U.S. Provisional Patent Application Ser. No. 62/004,053, filed May 28, 2014, the entirety of which is hereby incorporated herein by reference.

BACKGROUND OF THE INVENTION

1. Field of the Invention

The present invention relates to carbonized fibers and, more specifically, to carbonized fibers that include carbonized cellulose nano-structures.

2. Description of the Related Art

The vast majority of carbon fibers are currently processed from polyacrylonitrile (PAN). PAN fibers are typically drawn in a spinning process. They are then stabilized and carbonized to form carbon fibers. The addition of small amount of carbon nanotubes as reinforcement in PAN can result in more than a 50% increase in the modulus and tensile strength of the resulting carbon fiber. However, carbon nanotubes are still too expensive for common commercial uses.

Therefore, there is a need for an inexpensive method of making reinforced carbon fibers.

SUMMARY OF THE INVENTION

The disadvantages of the prior art are overcome by the present invention which, in one aspect, is a method of making a carbon fiber, in which polyacrylonitrile is dissolved into a first solvent, thereby generating a first solution. A plurality of cellulose nano-structures is dispersed in a second solvent, thereby generating a first suspension. The first suspension is mixed with the first solution, thereby generating a first mixture. The first mixture is spun so as to draw fibers from the first mixture. The fibers are stabilized and then the fibers are carbonized.

In another aspect, the invention is a fiber that includes an elongated carbonized polyacrylonitrile matrix. A plurality of carbonized cellulose nano-structures is dispersed in the carbonized polyacrylonitrile matrix.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
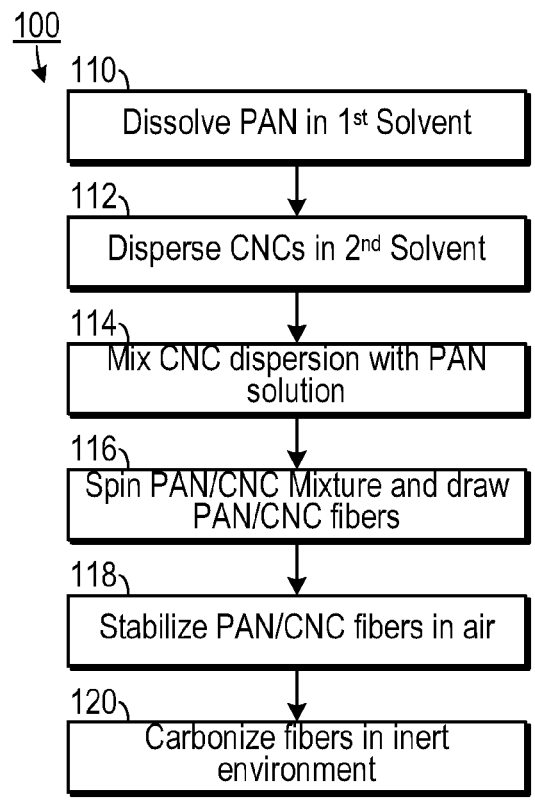
FIG. 1 is a flow chart showing one method of making carbon fibers.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, in one embodiment of a method of making a carbon fiber 100, polyacrylonitrile is dissolved into a first solvent, thereby generating a first solution 110. The polyacrylonitrile can be a polyacrylonitrile copolymer, a polyacrylonitrile homopolymer or combinations thereof. A plurality of cellulose nano-structures (such as cellulose nano-crystals, cellulose nano-fibrils and combinations thereof) is dispersed (for example, through bath sonication) in a second solvent, thereby generating a first suspension 112. The first suspension is mixed with the first solution, thereby generating a first mixture 114. The first mixture is spun so as to draw fibers from the first mixture 116. The fibers are stabilized in air 118 and then the fibers are carbonized 120. Stabilization and carbonation can be performed through techniques used in stabilization and carbonization of PAN fibers and cellulose fibers.

The first solvent and the second solvent can include solvents such as: dimethyl formamide (DMF); dimethyl acetamide (DMAc); dimethyl sulfoxide (DMSO). The same type of solvent can be used for the first solvent and the second solvent.

The fibers formed may be extruded into a cold methanol bath and stretched during spinning step. The stretching may include first drawing the fibers at room temperature and then stretching the fibers in a glycerol bath at a temperature that is greater than 100° C. In one embodiment, the fibers may be stretched until they have a draw ratio in a range of from 10 to 24.

In one embodiment, the cellulose nano-structures in the suspension have a weight that is in a range of between 1% to 30% of the weight of the polyacrylonitrile in the suspension. The cellulose nano-structures may also have an orientation that is predominantly aligned along an axis of the fibers.

Polyacrylonitrile (PAN)/Cellulose Nano Crystal (CNC) nano composite fibers can be spun using solvents such as dimethyl formamide (DMF), DMAc, DMSO etc. CNC weight concentration can be varied in the range of 1 to 30 weight percent with respect to the weight of the PAN polymer. PAN can be in the form of a homopolymer, a copolymers, or combinations thereof, where the copolymer content such as methacrylic acid, itaconic acid etc. can be selected based on their carbonization performance. Fibers are stabilized in air and carbonized in inert environment under tension.

Figures 2A, 2B:
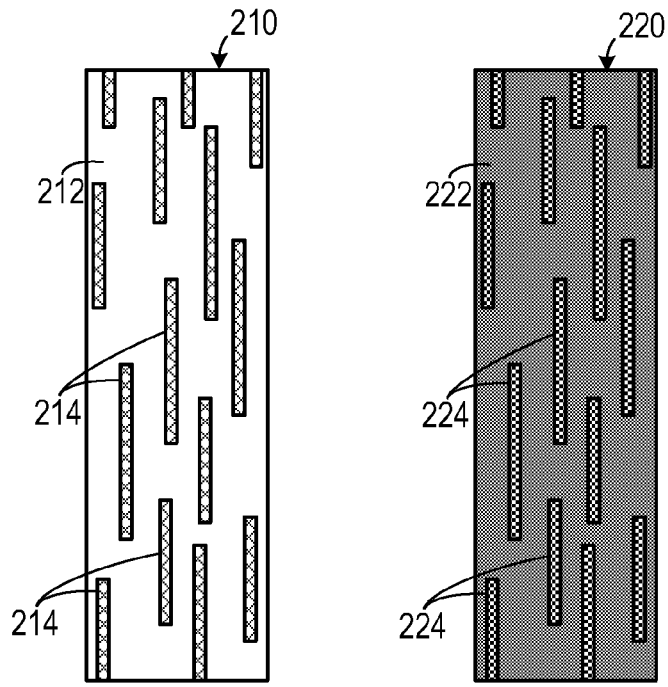
FIG. 2A is a schematic diagram of a fiber before carbonization.
FIG. 2B is a schematic diagram of a fiber after carbonization.

As shown in FIG. 2A, the pre-carbonization fiber 210 includes a PAN matrix 212 and a plurality cellulose nano-structures 214 dispersed throughout the PAN matrix 212. After carbonization, as shown in FIG. 2B, the fiber 220 includes carbonized PAN 222 and carbonized cellulose nano-structures 224. In one embodiment, the carbonized cellulose nano-structures make up about 30% of the weight of the fiber and the carbonized polyacrylonitrile matrix make up about 70% of the weight of the fiber.

In one experimental embodiment, polyacrylonitrile-co-methacrylic acid (PAN-co-MAA; 4 wt. % of MAA content, Mw ~2.4×105 g/mol) was obtained from Japan Exlan Corporation. Cellulose nano crystal (acid hydrolysis, dry powder) were obtained from The Process Development Center at The University of Maine. N, N-dimethyl formamide (DMF) was obtained from BDH Incorporation and was purified by distillation before use. CNCs were dispersed in DMF by bath sonication (Branson 3510R-MT, 100 W, 42 kHz) at a concentration of 75 mg/dL for 24 h. Meanwhile, PAN (14.85 g) was dissolved in DMF (100 mL) at 80° C. After CNC/DMF dispersion was added into PAN solution, the excess solvent was removed by vacuum distillation until the solution reached a desired solid concentration of 15 g/dL.

The PAN and PAN/CNC composite fibers were spun via a gel spinning technique. A Bradford spinning system with a single-hole spinneret (D=200 μm) was used, and the solution was extruded into a cold methanol bath (−50° C.) with an air-gap of 2 cm. During spinning, the fibers were stretched, and the stretching ratio was defined as the as-spun draw ration (DR). Prior to further drawing, the collected as-spun fibers were stored in cold methanol (−50° C.) for 72 hours. The fiber drawing was carried out in two stages: at room temperature in air followed by stretching at 165° C. in a hot glycerol bath. The drawn fiber was then washed in ethanol to remove glycerol. The total draw ratio was defined as the product of as-spun draw ratio, cold draw ratio (i.e draw ratio at room temperature), and hot draw ratio (i.e. draw ratio at 165° C.).

Dynamic mechanical tests were conducted at 10 Hz at a heating rate of 1° C./min, and on bundles of 10 filaments at 25.4 mm gauge length. Wide-angle X-ray diffractions of PAN-co-MAA control and composite fibers were collected by Rigaku MicroMax 002 X-ray generator with confocal optics to produce Kα radiation (I=1.5418 A) and equipped with a R-axisIV++ detector. The crystallinity was calculated by fitting the integrated scan using MDI Jade 8.5.2 software, and the crystal size was calculated from the FWHM (Full width at half the maximum intensity) of the crystalline peaks from the equatorial scan. Tensile tests were conducted at 1 inch gage length using FAVIMAT tensile tester.

Cellulose nano-crystals (CNC) and nano-fibrils offer an attractive alternative to carbon nanotubes in reinforcing PAN fibers. CNCs have a near perfect crystal structure and high strength (7.5 GPa) and high modulus (110-220 GPa). Depending on the CNC source, their transverse dimension is in the range of 3-15 nm and length in the range of 100 nm to 3 μm. Once carbonized under tension, these CNCs will form highly ordered graphitic fibrils. It is well known that on carbonization, the tensile strength of PAN fibers increases by a factor of about 6 and a similar increase in strength is achieved on carbonization of rayon fiber. If similarly a factor of six increase is achieved on carbonization of CNC, then the axial tensile strength of CNC would exceed 40 GPa and their axial tensile modulus will be close to the theoretical tensile modulus of graphite, that is 1060 GPa. Tensile strength of over 40 GPa is quite reasonable and expected for the carbonized near perfect cellulose nano crystal, considering that tensile strength of 20 GPa was measured on carbon whiskers and that tensile strength in the range of 25 to 60 GPa have been measured for carbon nanotubes and for graphene over the last decade. Also, it should be noted that the theoretical tensile strength of the perfect graphitic carbon structures are in the range of 100 to 150 GPa based on both classical and quantum mechanical considerations. If the 30% weight of the carbon fiber is composed of near perfect carbonized CNCs and 70% weight is that of carbonized PAN (with a tensile strength of 5 GPa and tensile modulus of 300 GPa), then the resulting PAN/CNC composite fiber is estimated to have a tensile modulus approaching 500 GPa and tensile strength approaching 15 GPa. Actual realization of these properties will depend on the interfacial strength between carbonized CNC and carbonized PAN as well as on the orientation of carbonized CNC in the fiber, as well as on the aspect ratio of the carbonized CNC fibril. Interfacial strength between PAN and CNC can be chemically tailored, while highest aspect ratio and most perfect cellulose nano crystals will be used, and gel spinning inherently produces high molecular (PAN) and filler (CNC) orientations. Even the achievement of only 8 GPa tensile strength and 400 GPa tensile modulus will result in a highly useful commercial fiber.

Carbon fibers containing cellulose nano crystals (made from natural materials such as wood) will have green foot print. These high strength and high modulus carbon fibers will find applications in composites for aerospace, automobiles, and wind-mill blades among others. PAN/CNC composite fibers have been processed using gel spinning technology. These composite fibers exhibit higher mechanical properties than the control fiber without CNCs.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of making a carbon fiber, comprising the steps of:
    (a) dissolving polyacrylonitrile into a first solvent, thereby generating a first solution;
    (b) dispersing a plurality of cellulose nano-structures in a second solvent, thereby generating a first suspension;
    (c) mixing the first suspension with the first solution, thereby generating a first mixture;
    (d) spinning the first mixture so as to draw fibers from the first mixture;
    (e) stabilizing the fibers; and
    (f) carbonizing the fibers.

2. The method of claim 1, wherein the cellulose nano-structures comprise a selected one of cellulose nano-crystals and cellulose nano-fibrils.

3. The method of claim 1, wherein the dispersing step comprises the step of applying bath sonication to the nano-structures and the second solvent.

4. The method of claim 1, further comprising the step of extruding the fibers formed from the first mixture into a cold methanol bath.

5. The method of claim 1, further comprising the step of stretching the fibers during the spinning step.

6. The method of claim 5, wherein the stretching step comprises:
    (a) drawing the fibers at room temperature; and
    (b) after the drawing step, stretching the fibers in a glycerol bath at a temperature that is greater than 100° C.

7. The method of claim 5, wherein the stretching step stretches the fibers until they have a draw ratio in a range of from 10 to 24.

8. The method of claim 1, wherein the cellulose nano-structures in the suspension have a weight that is in a range of between 1% to 30% of the weight of the polyacrylonitrile in the suspension.

9. The method of claim 1, wherein the cellulose nano-structures have an orientation that is predominantly aligned along an axis of the fibers.

10. The method of claim 1, wherein the first solvent comprises a solvent selected from a list consisting of: dimethyl formamide (DMF); dimethyl acetamide (DMAc); dimethyl sulfoxide (DMSO); and combinations thereof.

11. The method of claim 1, wherein the second solvent comprises a solvent selected from a list consisting of: dimethyl formamide (DMF); dimethyl acetamide (DMAc); dimethyl sulfoxide (DMSO); and combinations thereof.

12. The method of claim 1, wherein the polyacrylonitrile comprises a selected one of a polyacrylonitrile copolymer and a polyacrylonitrile homopolymer.

13. A fiber, comprising:
   (a) an elongated carbonized polyacrylonitrile matrix; and
   (b) a plurality of carbonized cellulose nano-structures dispersed in the carbonized polyacrylonitrile matrix.

14. The fiber of claim 13, wherein the carbonized cellulose nano-structures comprise 30% of the weight of the fiber and wherein the carbonized polyacrylonitrile matrix comprises 70% of the weight of the fiber.

15. The fiber of claim 13, wherein the carbonized cellulose nano-structures are predominantly oriented along an axis of the fiber.

16. The fiber of claim 13, wherein the carbonized cellulose nano-structures comprise a selected one of carbonized cellulose nano-crystals and carbonized cellulose nano-fibrils.

\* \* \* \* \*